US008332079B2

(12) United States Patent
Kindt et al.

(10) Patent No.: US 8,332,079 B2
(45) Date of Patent: Dec. 11, 2012

(54) APPARATUS AND METHOD FOR REMOTELY CONTROLLING VEHICLE ENGINE SPEED

(75) Inventors: Alex Kindt, Ocala, FL (US); George H. Clementson, III, Summerfield, FL (US); Jeffrey Brian Beegle, Ocala, FL (US)

(73) Assignee: Class 1, Inc., Ocala, FL (US)

( * ) Notice: Subject to any disclaimer, the term of this patent is extended or adjusted under 35 U.S.C. 154(b) by 85 days.

(21) Appl. No.: 12/862,088

(22) Filed: Aug. 24, 2010

(65) Prior Publication Data

US 2011/0046815 A1 Feb. 24, 2011

Related U.S. Application Data

(60) Provisional application No. 61/236,256, filed on Aug. 24, 2009.

(51) Int. Cl.
*G05D 1/00* (2006.01)

(52) U.S. Cl. .......................................................... 701/2

(58) Field of Classification Search ........................ None
See application file for complete search history.

(56) References Cited

U.S. PATENT DOCUMENTS

| | | | | |
|---|---|---|---|---|
| 4,516,063 | A * | 5/1985 | Kaye et al. | 318/685 |
| 6,772,732 | B1 | 8/2004 | McLaughlin et al. | |
| 2002/0128753 | A1 * | 9/2002 | Numata et al. | 701/1 |
| 2010/0324799 | A1 * | 12/2010 | Davison | 701/100 |

* cited by examiner

*Primary Examiner* — Thomas Tarcza
*Assistant Examiner* — Nagi Alharbi
(74) *Attorney, Agent, or Firm* — Panitch Schwarze Belisario & Nadel LLP

(57) ABSTRACT

An apparatus for remotely controlling the speed of an engine includes a housing and a control knob. A position shaft is fixedly connected to the control knob for rotation therewith and a position gear is fixedly secured to the position shaft for rotation therewith. A rotary encoder has a shaft in operative engagement with the position gear such that rotation of the position gear rotates the encoder shaft. The rotary encoder generates output signals based on a direction of rotation and angular displacement of the control knob. A processor receives the output signals from the rotary encoder and generates output signals proportional to the direction of rotation and angular displacement of the control knob. A primary engine control unit is remotely located with respect to the remote housing for receiving the output signals from the processor and directly controlling the speed of the engine based upon the received signals.

7 Claims, 6 Drawing Sheets

APPARATUS AND METHOD FOR REMOTELY CONTROLLING VEHICLE ENGINE SPEED

CROSS-REFERENCE TO RELATED APPLICATIONS

The present application claims priority to U.S. Provisional Patent Application. No. 61/236,256, filed Aug. 24, 2009 and entitled "Apparatus and Method for Remotely Controlling Vehicle Engine Speed."

BACKGROUND OF THE INVENTION

The present invention relates generally to controlling the speed of an engine and, more particularly to an apparatus and method for manually and remotely electronically controlling the speed of an engine, particularly a vehicle engine. The present invention has specific applicability to vehicles, such as fire trucks where in addition to propelling the vehicle, the engine is used to power vehicle mounted equipment such as a vehicle mounted pump.

BRIEF SUMMARY OF THE INVENTION

Briefly stated, the present invention is directed to an apparatus for remotely controlling the speed of an engine. The apparatus includes a housing and a control knob supported by the housing for movement. A position shaft is fixedly connected to the control knob for rotation with the control knob and a position gear is fixedly secured to the position shaft for rotation therewith. A rotary encoder has an encoder shaft in operative engagement with the position gear such that rotation of the position gear rotates the encoder shaft. The rotary encoder generates output signals based on a direction of rotation and angular displacement of the control knob. The apparatus further includes a processor for receiving the output signals from the rotary encoder and generating output signals proportional to the direction of rotation and angular displacement of the control knob. A primary engine control unit is remotely located with respect to the remote housing for receiving the output signals from the processor and directly controlling the speed of the engine based upon the received signals.

BRIEF DESCRIPTION OF THE SEVERAL VIEWS OF THE DRAWINGS

The following detailed description of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
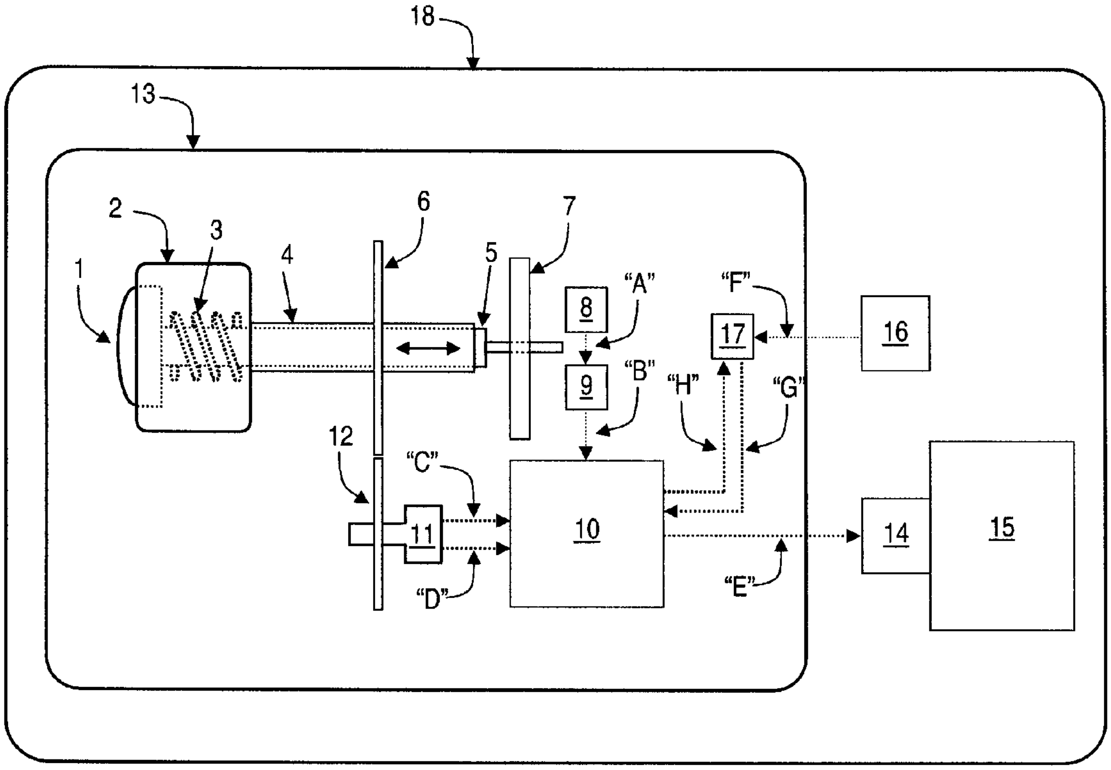
FIG. 1 is a schematic block diagram of a preferred embodiment of an apparatus for remotely controlling the speed of a vehicle engine in accordance with the present invention.

Certain terminology is used in the following description for convenience only and is not limiting. The words "right," "lower" and "upper" designate directions in the drawings to which reference is made. The word "outwardly" refers to a direction away from the geometric center of the remote control apparatus and designated parts thereof. Unless specifically set forth herein, the terms "a," "an" and "the" are not limited to one element but instead should be read as meaning "at least one." The terminology includes the words noted above, derivatives thereof and words of similar import.

Referring to FIG. 1, there is shown a schematic block diagram of an apparatus for remotely controlling the speed (RPM) of an engine 15 within a vehicle 18. The vehicle 18 in the present embodiment is a fire truck. However, the vehicle 18 could be any type of car, truck, military vehicle, ambulance or any other type of movable vehicle which is powered for movement by an engine 15. In the present embodiment the engine 15 is a standard gasoline or diesel powered internal combustion engine of a type typically used to propel a fire truck. However, the engine 15 could be any other type of engine or other apparatus for propelling or otherwise providing power to a vehicle 18 including an electrically powered engine, hydrogen powered engine, a hybrid engine or the like. It should be clearly understood that the present invention is not limited to use with a gasoline or diesel powered internal combustion engine or such an engine within a fire truck.

In the present embodiment, the engine 15 provides power to propel the fire truck 18 from one location to another in a manner well known in the art. The engine 15 also provides power to operate one or more pieces of equipment or devices located on or associated with the fire truck 18, either during movement of the fire truck 18 or when the fire truck 18 is stationary. For example, with the fire truck 18, the engine 15 is also used to provide power to, for example, a pump (not shown) within or mounted to the fire truck 18 for pumping water or some other fire suppressing fluid through appropriate hoses, pipes or the like (not shown) onto a fire. The speed or RPM of the engine 15 is directly controlled by a primary electronic engine control unit 14 or primary engine control unit. In the present embodiment the primary control unit 14 is a J1939 CAN engine control which is configured based on the requirements of the engine manufacturer. Any other suitable primary control unit may alternatively be used.

The present invention permits an operator to manually control the speed of the engine 15 electronically from a location which is remote from the vehicle cab to facilitate the operation of some piece of equipment or device located remotely from the vehicle cab. For example, in a fire truck 18, the present invention provides the capability of manually controlling the speed of the engine 15 from the rear or side of the truck 18 proximate to the location of the controls for a pump (not shown) which is driven by the engine 15. In operation, the primary control unit 14 receives an input signal (which may be electrical, mechanical, hydraulic or the like) and based upon a predetermined characteristic of the received signal changes (increases or decreases) or maintains the speed of the engine 15 for operation of the pump. The primary control unit 14 is of a type that is well known in the art as discussed above and need not be further described for a complete understanding of the present invention.

As show in FIG. 1, the remote control apparatus in accordance with the present embodiment is located within a housing 13 which is preferably mounted to the fire truck 18 at a convenient location preferably proximate to the pump or other equipment or devices driven by the engine 15 or the controls for the pump or other such equipment or devices. A manually operated control knob 2 is supported for movement or rotatably supported by the housing 13 and extends at least slightly outside of the housing 13 for convenient gripping and rotation by an operator. The control knob 2 is fixedly connected to a position shaft 4 within the housing 13 for rotation with rotation of the control knob 2. A position gear 6 is fixedly secured to the position shaft 4 for rotation therewith. Gear teeth on the outer periphery of the position gear 6 are meshed with suitably sized gear teeth on the outer periphery of an aligned encoder gear 12 so that rotation of the position gear 6 causes the encoder gear 12 to rotate accordingly. The encoder gear 12 is fixedly secured to a shaft 11*a* (FIG. 4) of a manual/mechanical rotary encoder 11. Alternatively, at least a portion of the position gear 6 may operatively or directly engage a portion of the encoder shaft 11*a* such that rotation of the position gear 6 rotates the encoder shaft 11*a*.

Figure 4:
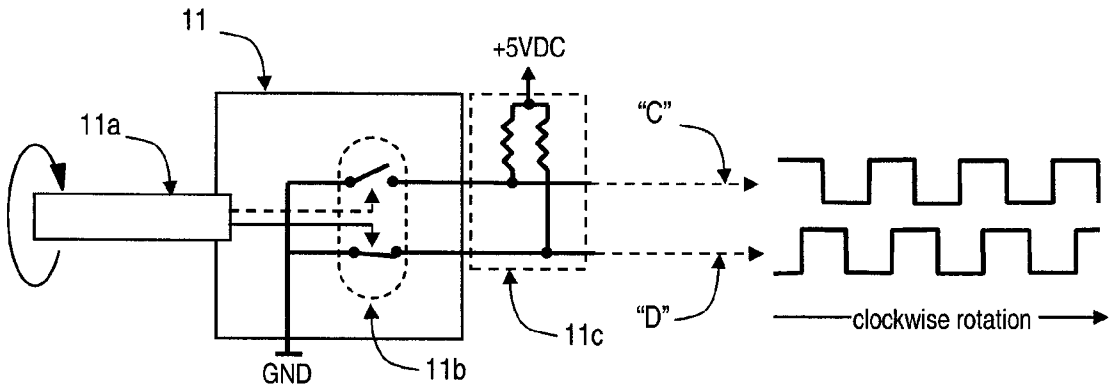
FIG. 4 is a schematic block diagram of a portion of the apparatus of FIG. 1 with corresponding output signals.

As shown in greater detail in FIG. 4, the mechanical rotary encoder 11 in the present embodiment, is preferably an off-the-shelf two bit quadrature incremental encoder model E33 available from ELMA of Freemont Calif. It should be appreciated that other mechanical encoders or other types of encoders may alternatively be used and that the present invention is not limited to a particular rotary encoder or type of rotary encoder. As shown, rotation of the encoder shaft 11*a* causes each or a pair of encoder contacts 11*b* to alternate between the open and closed states. An encoder contact 11*b* in a closed state such as illustrated by the lower contact 11*b* provides a digital "OFF" or ground signal on the corresponding output line D. An encoder contact 11*b* in the open state such as illustrated by the upper contact 11*b* provides a digital "ON", five volt DC signal on the corresponding output line C due to an external voltage source and a pair of pull up resistors 11*c*. The two encoder contacts 11*b* are ninety degrees out of phase with each other to produce the two electrical (digital) output position signals on output lines C and D shown to the right side of FIG. 4 which are ninety degrees out of phase. The signals shown in FIG. 4 illustrate the output signals on lines C and D when the encoder shaft 11*a* is rotated in the clockwise direction with the signal on output line D leading the signal on output line C by ninety degrees. If the encoder shaft 11*a* is rotated in the counterclockwise direction the signal on output line C leads the signal on output line D by ninety degrees. As shown in FIG. 1, the output lines C and D from the rotary encoder 11 are provided as inputs to a processor, such as a microprocessor 10, located within the housing 13. As discussed in greater detail below, the microprocessor 10 provides output signals along output line E to the primary control unit 14 for controlling (increasing or decreasing) the speed of the engine 15 proportional to (linearly) the direction of rotation and angular displacement of the control knob 2 as translated by the rotary encoder 11.

Figure 6A:
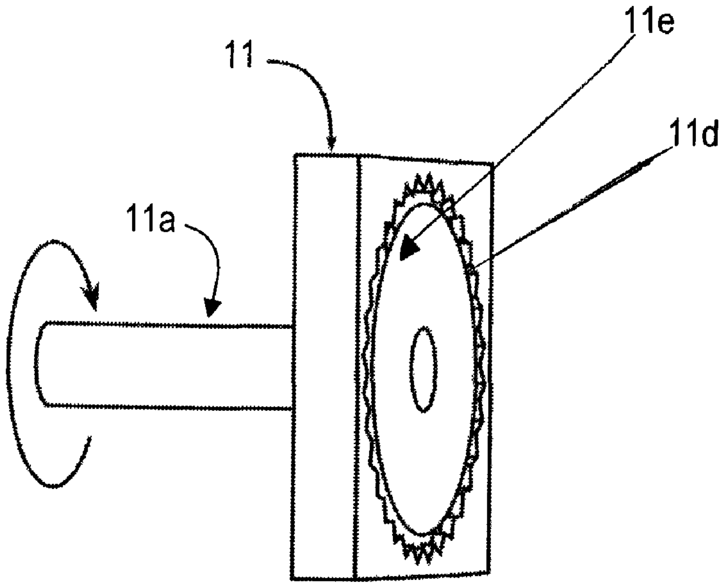
FIG. 6A is a perspective view of a portion of the structure of the apparatus of FIG. 1.
Figure 6B:
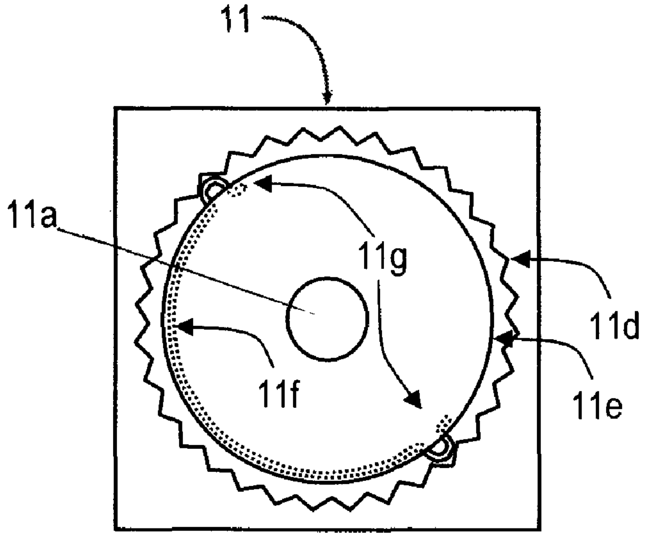
FIG. 6B is a side elevation view of a portion of the structure of the apparatus of FIG. 1.

FIGS. 6A and 6B show portions of the interior of the mechanical rotary encoder 11 in greater detail. The rotary encoder 11 includes an internal housing 11*d* enclosing an encoder wheel 11*e* which rotates with the encoder shaft 11*a*. The internal housing 11*d* further includes a plurality, in the present embodiment, thirty-two, generally equally spaced apart recesses extending around an interior surface thereof. It will be appreciated that a lesser or greater number of recesses may be used if desired. The encoder wheel 11*e* includes a pair of curved position indexes 11*g* on opposite ends of a position index spring 11*f* which bias each of the position indexes 11*g* generally radially outwardly to engage two of the recesses on opposite sides of the internal housing 11*d*. As the encoder wheel 11*e* rotates, the engagement of the two position indexes 11*g* with the recesses maintain a positive position and provides tactile feedback to the operator as the control knob 2 is rotated. It will be appreciated that some other form of detent mechanism or other positive tactile feedback device or mechanism may alternatively be provided.

Figure 5:
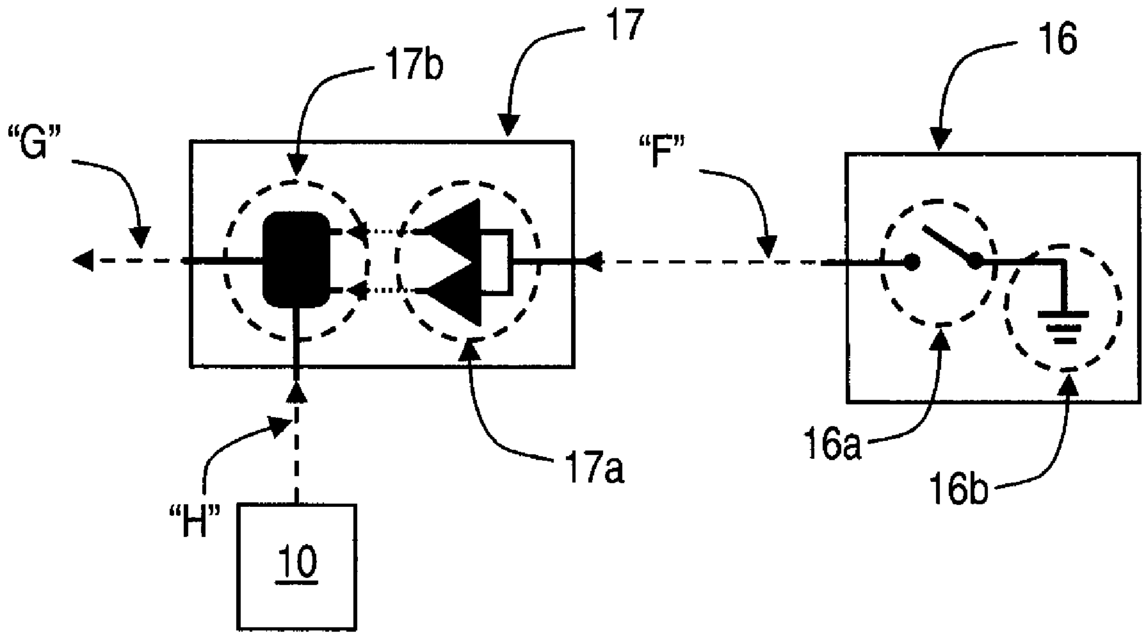
FIG. 5 is a schematic black diagram of another portion of the apparatus of FIG. 1.

Referring to FIGS. 1 and 5, the apparatus further includes an interlock device or circuit 17 which functions to prevent remote control of the speed of the engine 15 unless one or more predetermined conditions are met. For example, in the case of a fire truck 18, it is desirable to prevent remote control of the speed of the engine 15 while the fire truck 18 is moving. In the present embodiment the status of the parking brake is used to make the determination as to whether the fire truck 18 is moving; if the parking brake is engaged it is assumed that the fire truck 18 is not moving and remote control of the speed of the engine 15 is permitted. The parking brake or other condition indicating device is provided with an interlock source 16. In the present embodiment in which the condition of the parking brake is used, the interlock source 16 is comprised of a contact switch 16*a* and a source voltage or ground 16*b*. Vehicle manufacturers may desire to connect the parking brake to either a positive system (vehicle) voltage, such as twelve volts DC, or to ground potential 16*b* as shown. The present apparatus works equally well with either connection. A voltage signal, in this embodiment zero volts or ground, is provided along output line F whenever the parking brake is engaged so that the switch 16*a* is closed.

The apparatus also includes an interlock polarity control circuit 17 which is connected to the interlock source 16 along line F. The interlock polarity control circuit 17 is a discrete electronic circuit that in the present embodiment includes a pair of parallel operational amplifiers 17*a* for receiving the voltage signal (a voltage or ground) from the interlock source 16 along line F and converting the interlock source signal into an ON or an OFF output signal. The output signals from the operational amplifiers 17*a* are each provided to a polarity selector 17*b*. The polarity selector 17*b* also receives a control signal from the microprocessor 10 along line H which dictates which of the signals from the operational amplifiers 17*a* is correct for indicating the application of the parking brake for the particular vehicle configuration. The polarity selector 17*b* compares the signal received from the microprocessor 10 with the signals received from the operational amplifiers 17*a* and generates an interlock active output signal, a TTL level HIGH, when the received voltages are the same. The output signal from the polarity selector 17*b* is sent to the microprocessor 10 along line G to indicate to the microprocessor 10 that the condition (parking brake on) has been met to thereby enable operation of the remote control apparatus. It will be appreciated that other components or different circuits may be employed for providing the polarity control function and that the invention is not limited to the disclosed operational amplifiers 17*a* and polarity selector 17*b*.

Figure 2:
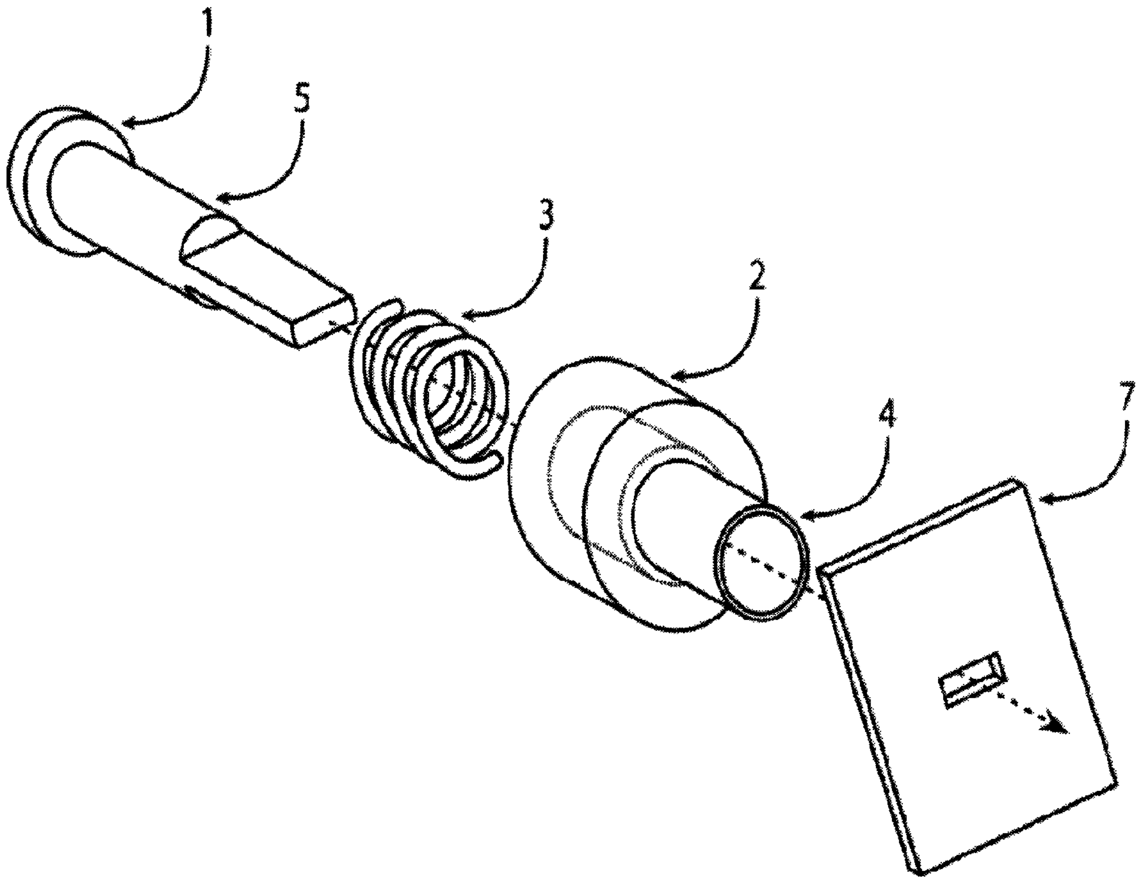
FIG. 2 is a perspective view of a portion of the apparatus shown in FIG. 1.

It is desirable to provide for the remote control apparatus to promptly and effectively set or re-set the speed of the engine 15 to the idle speed. Referring to FIGS. 1 and 2, the present embodiment includes an idle button 1 which extends at least slightly outwardly from the rotatable control knob 2 so as to be clearly visible and easily accessible to the operator. The idle button 1 is fixedly secured to an idle rod 5 which extends slidably through the open interior of the control knob 2 and the position shaft 4. A generally flattened, generally rectangularly shaped (in cross section) portion on the distal end of the idle rod 5 extends through a suitably sized and shaped rectangular opening in an idle rod indexing plate 7. The indexing plate 7 is supported by the housing 13 beyond the distal end of the position shaft 4 and maintains the idle button 1 with a generally horizontal orientation, in the present embodiment, with respect to the control knob 2 so that indicia, such as the word "IDLE" (not shown), on the outer surface of the idle button 1 remains in the proper horizontal orientation for easy readability by an operator regardless of the angular position of the control knob 2. A biasing member such as an idle button return spring 3 surrounds the idle rod 5 and engages the back side of the idle button 1 and a stop member (not shown) within the control knob 2 to return the idle button 1 to the original position as shown in FIG. 1 after the idle button 1 has been depressed and released.

As shown in FIG. 1, a light source 8, such as a light emitting diode or laser diode is located within the housing 13 near the distal end of the idle rod 5. A light detector 9, such as a charge coupled device (CCD) is also located within the housing 13 and is oriented to receive light from the light source 8 along line A. As can be seen in FIG. 1, the depressing of the idle button 1 by an operator causes the distal end of the idle rod 5 to be imposed between the light source 8 and the light detector 9 to effectively block or interrupt the light signal from the light source 8 to the light detector 9. Whenever the light signal along line A from the light source 8 is blocked or is otherwise not received by the light detector 9, the light detector 9 generates a digital output signal or idle request signal, which is sent to the microprocessor 10 along line B. When the microprocessor 10 receives the idle request signal, the microprocessor 10 immediately sends a signal to the primary control unit 14 to set the speed of the engine 15 to idle. Thereafter the engine 15 remains at the idle speed even after the idle button 1 is released and returned by the idle button return spring 3 to the original position (FIG. 1) and even though the light path from the light source 8 to the light detector 9 is no longer blocked. The speed of the engine 15 may thereafter by changed by rotating the control knob 2.

Figure 3:
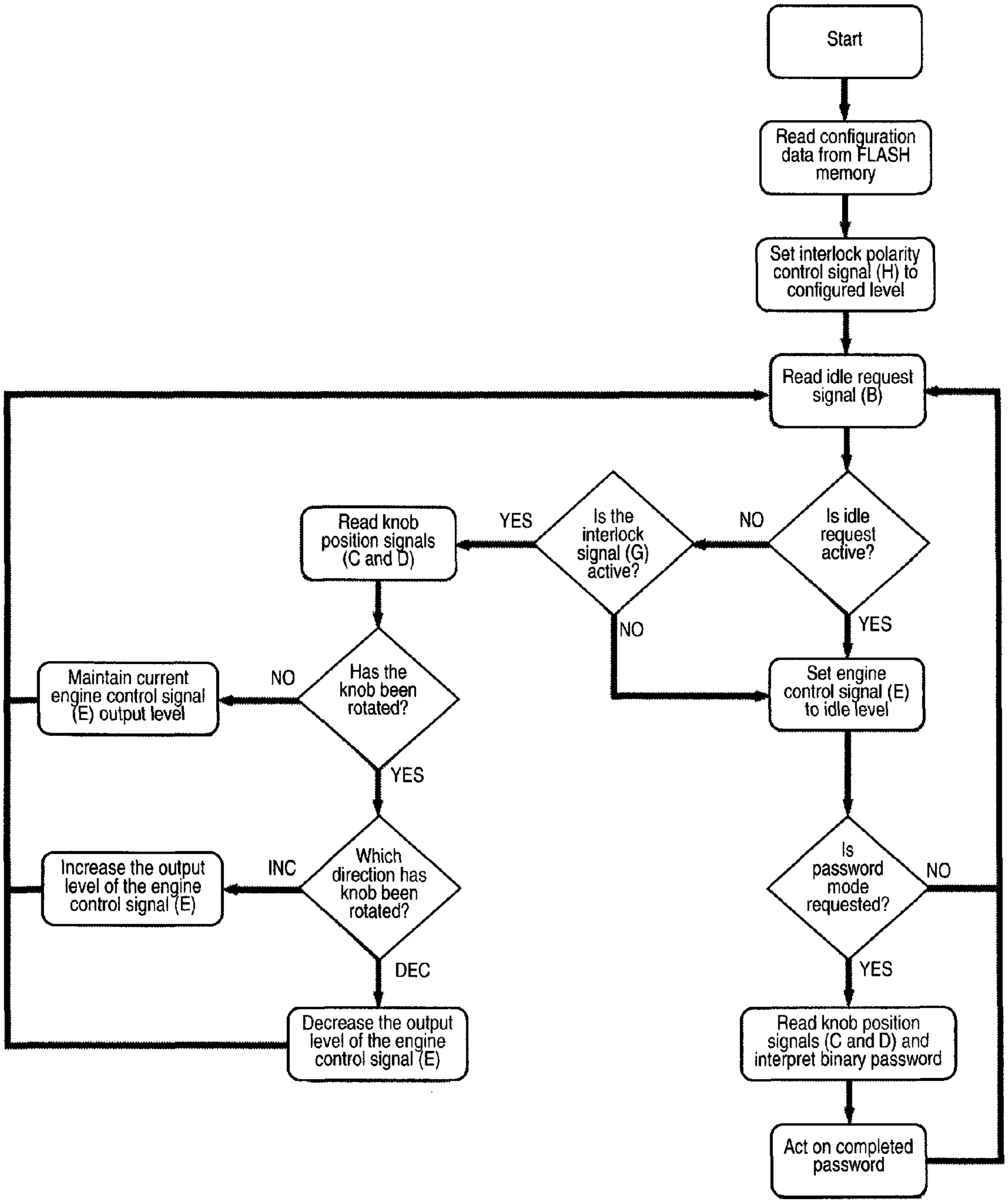
FIG. 3 is a schematic flow diagrammatic illustrating the steps involved in the operation of the apparatus of FIG. 1.

In the present embodiment the microprocessor 10 is an ATMEL T89C51CC01 8-bit microcontroller with a Controller Area Network (CAN) communication controller and flash memory. It should be appreciated that other processors, microprocessors, controllers and the like may alternatively be used. The microprocessor 10 is programmed to perform the above and below described functions. FIG. 3 is a functional flow diagram showing the operational features controlled by the software and the microprocessor 10. As can be seen from the flow diagram, assuming no idle request signal has been received (B) and that the interlock signal has been received (G) the microprocessor 10 reads the output signals (C and D) from the rotary encoder 11, determines (based on which signal leads) the direction of rotation of the rotary encoder 11 and generates an output signal to either increase or decrease the speed of the engine in proportion to the angular displacement of the rotary encoder. The generated output signal is sent by the microprocessor 10 to the primary control unit 14 along line E for changing or maintaining the speed (RPM) of the engine 15. Further details of the operation of the apparatus may be obtained by referring to the flow diagram of FIG. 3.

The apparatus also provides for configuration or re-configuration for differing engine arrangements. For example, the engine idle RPM, the maximum engine RPM, the interlock polarity, the direction of rotation of the control knob 2 for engine RPM increases/decreases, etc. may be configured or reconfigured. In addition, the apparatus may provide for control knob 2 deadband or a neutral zone. A password system is incorporated into the software to facilitate such configurations or re-configurations. The bi-directional rotation of the control knob 2 allows for the entry of digital numbers into the microprocessor 10 along line C and D. Binary numbers are compared to ON states and OFF states. The clockwise (CW) rotation of the control knob 2 is interpreted as a binary ON state or "one" and the counterclockwise (CCW) rotation of the control knob 2 is interpreted as a binary OFF state or "zero." For example, if the password was 10010011, entry of the password would involve turning the control knob 2 as follows: CW, CCW, CCW, CW, CCW, CCW, CW, and CW. The entry of passwords and the changing of the software configuration are preferably only permitted when the idle button 1 is depressed and held for the duration of the rotations of the control knob 2. Releasing the idle button 1 erases any attempted entry of the password to allow a clean slate for re-entering the password.

Referring again to FIG. 3, there is shown a schematic flow diagram of a method for remotely controlling the engine speed of the fire truck 18. The method preferably includes starting the engine 15 and reading configuration data from memory of the processor 10. The method preferably includes setting the interlock circuit 17 to recognize when one or more predetermined conditions are satisfied (H), reading an idle signal request activated by the idle button 1 (B), and setting the engine speed to idle if the idle signal request is activated (E). Further, the method preferably includes reading the position of the rotary control knob 2 if the one or more predetermined conditions are satisfied (C and D), maintaining a current engine control signal (E) if the rotary control knob 2 has not been rotated, increasing the output level of the engine control signal (E) if the rotary control knob 2 has been rotated in a first direction, and decreasing the output level of the engine control signal (E) if the rotary knob has been rotated in an opposite second direction.

From the foregoing, it can be seen that the present invention comprises an apparatus and method for manually and remotely controlling the speed of an engine, particularly a fire truck engine. It will be appreciated by those skilled in the art that changes could be made to the embodiment described above without departing from the broad inventive concepts thereof. It is understood, therefore, that this invention is not limited to the particular embodiment disclosed, but it is intended to cover all modifications within the spirit and scope of the present invention as defined by the appended claims.

We claim:

1. An apparatus for remotely controlling the speed of an engine, the apparatus comprising:

a housing;

a control knob supported by the housing for movement;

a position shaft fixedly connected to the control knob for rotation with the control knob;

a position gear fixedly secured to the position shaft for rotation therewith;

a rotary encoder having an encoder shaft in operative engagement with the position gear such that rotation of the position gear rotates the encoder shaft, the rotary encoder generating output signals based on a direction of rotation and angular displacement of the control knob;

a processor for receiving the output signals from the rotary encoder and generating output signals proportional to the direction of rotation and angular displacement of the control knob; and a primary engine control unit remotely located with respect to the housing for receiving the output signals from the processor and directly controlling the speed of the engine based upon the received signals.

2. The apparatus according to claim 1 wherein the control knob extends at least slightly outside of the housing which is mounted to a vehicle, the position shaft, the position gear, the rotary encoder and the processor being located within the housing.

3. The apparatus according to claim 1 wherein the engine provides power to propel a vehicle and power to operate one or more pieces of equipment or devices located on or associated with the vehicle.

4. The apparatus according to claim 1 wherein an encoder gear is in meshing engagement with the position gear, and wherein the encoder gear is fixedly secured to the encoder shaft of the rotary encoder such that rotation of the encoder gear rotates the encoder shaft.

5. The apparatus according to according to claim 1 further comprising an idle button extending by sliding action through an open interior of the control knob and the position shaft, wherein depression of the idle button causes the processor to set the engine at idle speed.

6. The apparatus according to according to claim 5 wherein the idle button includes an idle rod that extends through the open interior of the control knob and the position shaft, a portion of the idle rod engaging an opening in an indexing plate supported by and located within the housing, the indexing plate supporting the idle button in a predetermined orientation to maintain the proper orientation of indicia on an outer surface of the idle button; and further comprising:

a light source located within the housing; and a light detector located within the housing and oriented to receive light from the light source, wherein depression of the idle button causes a portion of the idle rod to be imposed between the light source and the light detector to interrupt the light signal form the light source to the light detector, which causes the light detector to send a signal to the processor to set the speed of the engine to idle.

7. The apparatus according to claim 1 wherein the rotary encoder further comprises:

an internal housing having a plurality of generally equally spaced apart recesses extending around an interior surface of thereof; and an encoder wheel located within the internal housing which rotates with rotation of the encoder shaft, the encoder wheel having a pair of position indexes on opposite ends of a position index spring, the position index spring biasing each of the position indexes generally radially outwardly to engage two of the recesses on opposite sides of the internal housing, wherein rotation of the encoder wheel maintains a positive position of the two position indexes with the recesses to provide tactile feedback to an operator as the control knob is rotated.

* * * * *